US006847760B2

(12) United States Patent
Argon et al.

(10) Patent No.: US 6,847,760 B2
(45) Date of Patent: Jan. 25, 2005

(54) SPATIALLY RESOLVED EQUALIZATION AND FORWARD ERROR CORRECTION FOR MULTIMODE FIBER LINKS

(75) Inventors: Cenk Argon, Atlanta, GA (US); Steven William McLaughlin, Decatur, GA (US); Ketan Patel, Yardley, PA (US); Stephen E. Ralph, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 355 days.

(21) Appl. No.: 10/202,277

(22) Filed: Jul. 24, 2002

(65) Prior Publication Data

US 2004/0247238 A1 Dec. 9, 2004

(51) Int. Cl.[7] ............................. G02B 6/26; H04J 14/02
(52) U.S. Cl. ............................. 385/28; 385/27; 385/31; 385/88; 385/24; 398/81; 398/44; 398/82
(58) Field of Search ............................. 385/15, 24, 27, 385/28, 29, 39, 123, 124, 88; 398/81, 82, 44, 147, 148, 149, 141

(56) References Cited

U.S. PATENT DOCUMENTS

| | | | |
|---|---|---|---|
| 3,689,772 A | 9/1972 | George et al. .............. 250/211 |
| 3,777,150 A | 12/1973 | Miller ......................... 250/209 |
| 4,050,782 A | 9/1977 | Uchida et al. ................ 350/96 |
| 5,563,897 A | 10/1996 | Pyndiah et al. ............ 371/37.4 |
| 5,699,179 A | * 12/1997 | Gopalakrishnan ........... 398/194 |
| 6,065,147 A | 5/2000 | Pyndiah et al. ............. 714/755 |
| 6,122,763 A | 9/2000 | Pyndiah et al. ............. 714/755 |
| 6,169,757 B1 | * 1/2001 | Merritt ......................... 372/50 |
| 6,381,045 B1 | * 4/2002 | DiGiovanni et al. .......... 398/42 |
| 6,404,793 B1 | * 6/2002 | Merritt ......................... 372/50 |
| 6,424,444 B1 | * 7/2002 | Kahn et al. .................. 398/141 |
| 6,445,476 B1 | * 9/2002 | Kahn et al. .................. 398/189 |
| 6,490,069 B1 | * 12/2002 | Kahn et al. .................. 398/183 |
| 2003/0146370 A1 | * 8/2003 | Ralph et al. .............. 250/214.1 |
| 2003/0147586 A1 | * 8/2003 | Ralph et al. ................... 385/31 |
| 2004/0022509 A1 | * 2/2004 | Tandon ......................... 385/127 |

OTHER PUBLICATIONS

David Chase, "A Class of Algorithms for Decoding Block Codes With Channel Measurement Information", IEEE Transactions on Information Theory, vol. IT–18, No. 1, Jan. 1972.

Ramesh Mahendra Pyndiah, "Near–Optimum Decoding of Products Codes: Block Turbo Codes", IEEE Transactions on Communications, vol. 46, No. 8, Aug. 1998.

Argon, et al. "Parallel Decoder For Product Codes"; Ser. No.: 10/202,205; Filing Date Jul. 24, 2002.

Ralph et al. "Compensation of Modal In Optical Waveguides", Ser. No.: 10/061,837; Filing Date Feb. 1, 2002.

Ralph et al. "Segmented Photodetectors For Detection and Compensation of Modal Dispersion in Optical Waveguides", Ser. No.: 10/061,621; Filing Date Feb. 1, 2002.

(List continued on next page.)

Primary Examiner—Brian M. Healy
(74) Attorney, Agent, or Firm—Thomas, Kayden, Horstemeyer & Risley, L.L.P.

(57) ABSTRACT

A system is described that includes a system for correcting modal dispersion and errors in an optical fiber system. The system includes a multisegment photodetector coupled to an end of an optical fiber for detecting optical signals exiting the optical fiber and for converting the optical signals to an electrical output, the multisegment photodetector including a plurality of photodetector regions configured such that one of the plurality of photodetectors regions intercepts a mode in a manner distinct from another of the plurality of photo-detectors. The system also includes logic configured to receive a resultant signal output from the photodetector regions and provide forward error correction decoding of the resultant signal.

63 Claims, 8 Drawing Sheets

OTHER PUBLICATIONS

Argon, et al. "Efficient Decoding of Product Codes", Ser. No.: 10/202,252; Filing Date Jul. 24, 2002.

Patel, et al., "Improved Multimode Link Bandwidth Using Spatial Diversity in Signal Reception".

Shur, M.S., "MSM Photodetector" drawing, Introduction to Electronic Devices, (1996), Wiley Publishing.

Hass, et al., "A Mode–Filtering Scheme for Improvement of the Bandwidth–Distance Product in Multimode Fiber Systems", *Journal of Lightwave Technology*, vol. 11 (7) pp. 1125–1130.

* cited by examiner

SPATIALLY RESOLVED EQUALIZATION AND FORWARD ERROR CORRECTION FOR MULTIMODE FIBER LINKS

TECHNICAL FIELD

The present invention is generally related to optical fiber systems and, more particularly, is related to signal processing in multimode fiber links.

BACKGROUND OF THE INVENTION

In an optical communication system deploying a multimode fiber, an optical signal launched into the fiber propagates along the fiber as multiple modes, each of which exhibits a different group velocity. A portion of the source optical signal resides in the different modes. The multiple modes can have different arrival times at the end of the fiber. The different group velocities of the modes cause a pulse formed from more than one mode to spread out as it propagates, and is referred to as intermodal dispersion, which distorts the optical signal. Intermodal dispersion causes the optical signal initially launched through a fiber at a predetermined frequency and an initial phase to vary as a function of the length of the fiber.

Modal dispersion reduces the maximum data transmission rate of the optical communication system and thus diminishes the total transmission capacity of the fiber. This results at least in part from the fact that modal dispersion spreads the optical pulse as it propagates. Thus, short pulses are limited to very short transmission distances and longer pulses can be transmitted further since the relative distortion of the pulse is smaller. Since shorter pulses typically require more bandwidth, multimode fiber is characterized by a bandwidth-distance product. Importantly, the bandwidth-distance products of typical multimode fiber are severely limiting. Modern multimode fiber incorporates a graded optical index profile within the core of the fiber to reduce modal dispersion. Unfortunately, modal dispersion remains the dominant bandwidth limiting mechanism in multimode fibers. Furthermore, as compared to single mode fibers, these limits reduce the capacity of multimode fiber by orders of magnitude.

The different propagation velocities of the distinct optical modes can lead to large differential mode delay (DMD) in multimode fibers. The severity of this modal dispersion can limit multimode fiber links to bandwidth-distance products of a few 500 MHz-kilometers. DMD results in intersymbol interference (ISI).

Thus, a need exists in the industry to address the aforementioned and/or other deficiencies and/or inadequacies.

SUMMARY OF THE INVENTION

The present invention includes, among others, systems and methods that correct for modal dispersion and errors in an optical fiber system. Briefly described, one embodiment of the invention can be implemented as a system that includes a multisegment photodetector coupled to an end of an optical fiber for detecting optical signals exiting the optical fiber and for converting the optical signals to an electrical output, the multisegment photodetector including a plurality of photodetector regions configured such that one of the plurality of photodetector regions intercepts a mode in a manner distinct from another of the plurality of photodetectors. The system also includes logic configured to receive a resultant signal output from the photodetector regions and provide forward error correction decoding of the resultant signal.

The present invention can also be described as a method that, in one embodiment, includes the following steps: detecting a plurality of optical signals radiating from an end of the multi-mode fiber by a multisegment photodetector having different detector regions that detect different portions of the plurality of optical signals; modifying detected signals by the multisegment photodetector to reduce effects of modal dispersion among the plurality of optical signals; and forward error correcting the modified detected signals. Other systems, methods, features, and advantages of the present invention will be or may become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the invention now will be described more fully hereinafter with reference to the accompanying drawings. One way of understanding the preferred embodiments of the invention includes viewing them within the context of an optical fiber communication system, and more particularly within the context of a system that includes functionality for photodetection, modal dispersion compensation, and/or error correction of a signal carrying information that is transferred over a multimode optical fiber communication system. This system, herein referred to as the detection-compensation-correction (DCC) system, preferably implements spatial resolution and equalization for detection and compensation of modal dispersion. The spatial properties of each mode (e.g., channels) delivered over the multimode fiber of the optical fiber communication system results in a spatial diversity of the temporal response within the emitted optical spot.

In one embodiment, a multisegmented photodetector of the DCC system is used to exploit this spatial diversity (i.e., spatial resolution) to improve the bandwidth of the optical fiber communication system. Specifically, concentric, multisegmented photodetectors are used to receive the optical modes, and the output of these segments are weighted and recombined (i.e., equalization). The magnitude and/or the phase of the signals output from the segments can be modified such that the resulting signals have the optimum temporal response. For example, the equalization can be limited with a fixed scalar weighting.

The DCC system also implements various forward error correction (FEC) methods to decode the spatially resolved and equalized signal. Herein, decoding will be understood to include error detection and/or error correction functionality. As indicated above, the temporal response of the optical fiber communication system can be severely affected by differential mode delay (DMD). The spatial resolution and equalization mechanisms alluded to above can eliminate some of the interference, but typically at the expense of some power loss at the photodetector output. The coding gain of an FEC decoding system of the DCC system will be used to "recover" some of this power loss. The coding gain is generally defined as the difference between the $E_b/N_0$ ratio needed to achieve a given bit error rate probability with coding and without coding, where $E_b$ is the energy per information bit and $N_0$ is the (one-sided) noise power spectral density, as is well known to those having ordinary skill in the art. In other words, by not implementing any error correction coding, the coding gain answers the question as to how much of a power increase is needed to get the same bit error rate. By "recovering" the power loss, the DCC system is not necessarily adding power, but because of the coding gain, the data rate can be increased considerably without an increased bit error rate (BER).

Because the preferred embodiments of the invention can be understood in the context of an optical fiber communication system, an initial general description of a multimode optical fiber communication system is provided that illustrates, among other components, the DCC system. Following this initial general description is a timing diagram that illustrates how the DCC system processes optical signals received from the optical fiber communication system. The description of the timing diagram is followed by two embodiments of a photodetection system, and further followed by an embodiment of a signal modifier for use with one or more embodiments of the photodetection system. One embodiment of the FEC decoding system is then described in the context of iterative soft decision decoding of product codes, followed by two example embodiments of the FEC decoding system for this latter implementation.

The FEC decoding system of the DCC system can operate on a plurality of FEC coding formats, including block codes (e.g., Reed-Solomon (RS) codes, BCH codes, etc.), product codes (e.g., two-dimensional block codes), convolutional codes, turbo codes, low density parity-check (LDPC) codes, among others. The FEC decoding system will be described in the context of an implementation that operates on product codes as one example implementation among others. The product codes will be described herein using a matrix format (e.g., rows and columns of symbols), with the understanding that product codes will not be limited to this matrix format but can take the form of substantially any encoded format used for transmitting data, whether formatted in ordered and/or random fashion. Generally, the product codes described herein will preferably include those formats exhibiting characteristics that include some form of error correction or control code iteration, some mechanism for gathering extrinsic information (e.g., information that can be used to determine the reliability of one or more symbol values), and some form of diversity (e.g., independence in row and column decoding operations). Note that extrinsic information will herein be understood to include real numbered values received from the photodetection system in addition to reliability information passed between a row and column decoder (or shared between row and column decoding operations).

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among other examples contemplated but not shown.

Figure 1:
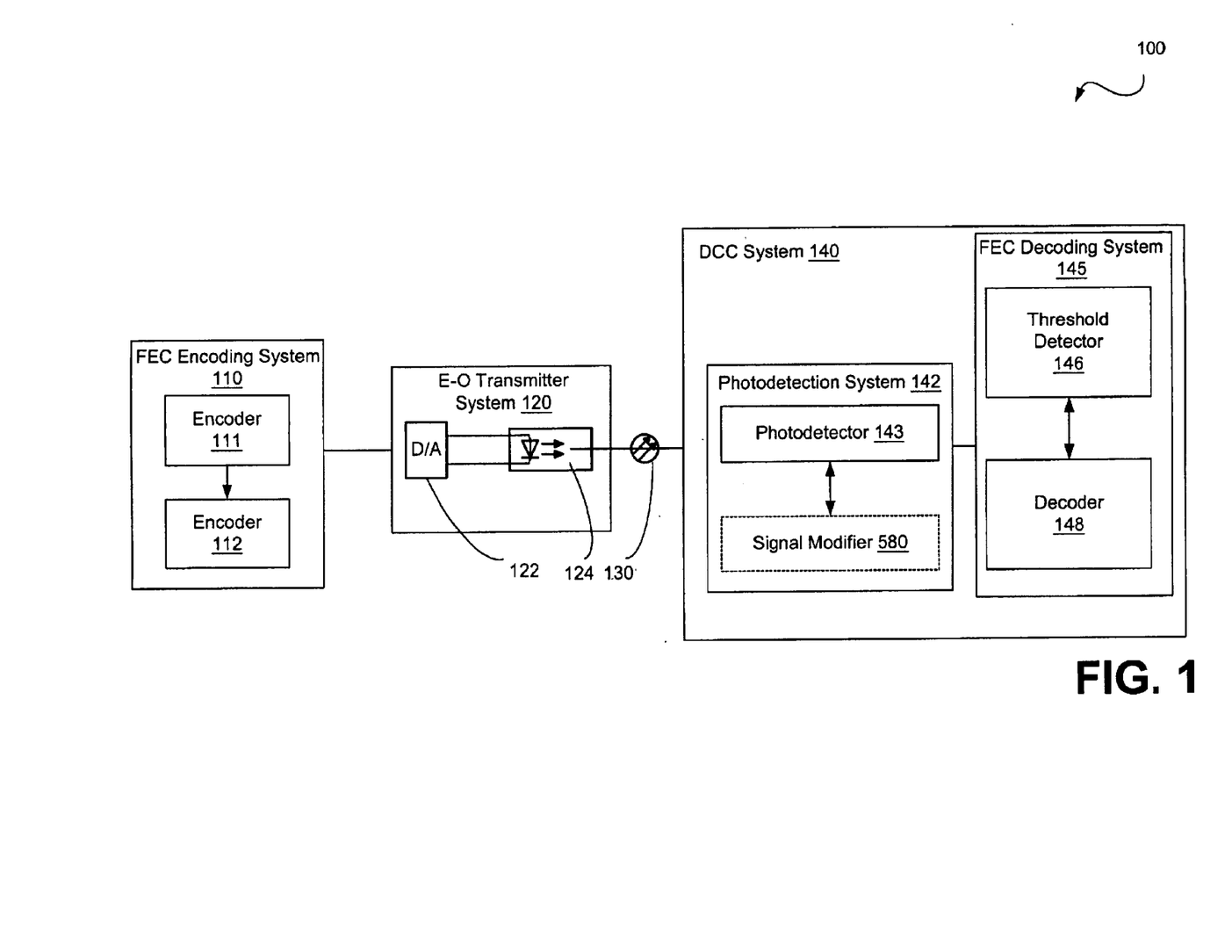
FIG. 1 is a block diagram of an example optical fiber communication system including an example detection, compensation, and correction (DCC) system that includes an example photodetection system and an example forward error correction (FEC) decoding system, in accordance with one embodiment of the invention.

Referring now in more detail to the drawings, in which like numerals indicate corresponding parts throughout the several views, FIG. 1 is a schematic diagram of an optical fiber communication system 100 that includes an FEC Encoding System 110, an electrical-to-optical (EO) transmitter system 120, a multimode fiber 130, and a DCC system 140 that includes a photodetection system 142 and an FEC decoding system 145. The FEC encoding system 110 preferably receives data from a signal source (not shown), such as a computer or a consumer electronics device, among other electrical and/or mechanical devices. Although shown as a separate entity, the FEC encoding system 110 can be integrated with the signal source in some embodiments. The FEC encoding system preferably includes encoders 111 and 112.

As indicated above, the information can be encoded according to substantially any FEC scheme. As one example implementation among many, an FEC scheme is described below implementing product codes in a matrix format of rows and columns. Product codes in a matrix format can be represented mathematically. In general, a two dimensional product code is obtained as follows: the information symbols are initially arranged in a $k_1 \times k_2$ array. Then, the columns are encoded using a linear block code $C_1$ ($n_1$, $k_1$, $\lambda_1$). Afterwards, the resulting $n_1$ rows are encoded using a linear block code $C_2$ ($n_2$, $k_2$, $\lambda_2$) and the product code, which consists of $n_i$ rows and $n_2$ columns is obtained. The parameters of code $C_i$ (i=1,2), denoted as $n_i$, $k_i$, and $\lambda_1$, are the codeword length, number of information symbols, and minimum Hamming distance, respectively. Codes $C_1$ and $C_2$ are called the constituent (or component) codes. The parameters of the resultant product code are $n_C = n_1 n_2$, $k_C = k_1 k_2$, $\lambda_C = \lambda_1 \lambda_2$, and the code rate is $R_C = R_1 R_2$, where $R_i = k_1/n_i$. To decrease implementation complexity of the encoders 111 and 112 and the decoder 148, preferably the same block code is selected as the row and column constituent code (i.e., $C_1 = C_2$).

Generally in a product code FEC scheme, information is encoded at encoder 111 with a first level of error correction information (e.g., parity). This information and parity can be ordered into a defined format, or in other embodiments, preferably randomized at encoder 111 and then passed to a second encoder 112 where it is encoded with another level of parity, and then output to the EO transmitter system 120 (i.e., data is sent to the EO transmitter 120 preferably in a serial fashion. For example, symbols (e.g., bits) are read out row-by-row, or column-by-column. At the FEC decoding side, explained below, the decoder 148 re-orders the data into the matrix form).

The EO transmitter system 120 preferably converts the encoded electronic signal to an optical signal, the process of which may include the use of a digital-to-analog converter 122 and a light source, such as a laser 124. The laser 124 launches an optical signal into a multimode fiber 130. The optical signal propagates along the multimode fiber 130. As the optical signal propagates in the multimode fiber 130, multiple modes of light are formed with many travelling through the multimode fiber 130 at different velocities. Preferably, wavelengths in which the laser 124 operates includes 850 nanometers (nm) and/or 1300 nm, among other possible wavelengths. A suitable laser includes a vertical cavity surface emitting laser (VCSEL) that is well known in the art, but may also include light emitting diodes (LED), distributed feedback (DFB) lasers or Fabry-Perot (F-P) lasers.

Positioned at the end of the multimode fiber 130 is the DCC system 140. In one implementation, multiple modes of light exiting from the multimode fiber 130 enter the photodetection system 142. The photodetection system 142 includes a photodetector, such as multi-segmented photodetector 143, for detection and compensation of modal dispersion. The photodetection system 142 can also include a signal modifier 580 in alternate embodiments (as represented by the dotted line box boundary) that compensates for the modal dispersion.

At the photodetector 143, the plurality of detected signals are altered and combined into one electrical output. This function occurs via the use of varying biases to alter (relative to each other) the individual electrical signal of each multiple segment or in cooperation with the separate signal modifier 580 in alternate embodiments. The photodetector 143 outputs an electrical signal that, if converted to an optical signal, is substantially similar to the originally transmitted optical signal launched from the laser 124 into the multimode fiber 130. It is possible to implement any necessary alteration, or weighting factor, to the plurality of detected signals by the use of appropriate bias among the plurality of detection segments. However, the signal modifier 580 may be used in alternate embodiments to adjust the signal as necessary. The selection of weighting factors is preferably chosen to reduce differences between the various modes. Moreover, weighting factors can be fixed or adjustable. The signal modifier 580 can include electronic and/or mechanical devices such as attenuators, delay lines, amplifiers, and/or phase shifters.

The spatially resolved and equalized output signal of the photodetection system 142 is then input to the FEC decoding system 145. The FEC decoding system 145 includes functionality for decoding one dimensional block codes (such as Reed-Solomon or BCH codes), multi-dimensional block codes (e.g., product codes like Turbo product codes), convolutional codes, turbo codes, or LDPC codes. In one embodiment, the FEC decoding system 145 includes a decoder 148 and a threshold detector 146. Although shown as separate components, functionality of each component can be merged into a single component in some embodiments. In some embodiments, threshold detector functionality can be implemented externally to the FEC decoding system 145, as explained below. The decoder 148 preferably includes functionality for sequential or, in some embodiments, substantially simultaneous row and column decoding, in accordance with one embodiment of the invention. Further information on substantially simultaneous row and column decoding can be found in the commonly assigned patent application entitled, "A Parallel Decoder For Product Codes", filed on the same date, assigned to Georgia Tech, and herein incorporated by reference. In one example implementation, the spatially resolved and equalized information can be received as symbols (e.g., data) formatted as voltage values from the spatial resolution and equalization (including weighting) at the photodetection system 142.

The decoder 148 preferably decodes the rows and columns of the product codes. In cooperation with one or more threshold detectors, such as threshold detector 146, the decoder 148 uses the real number valued information of the received spatially resolved and equalized input signal to provide error correcting on the received signal, in accordance with one embodiment of the invention. In one implementation, the threshold detector 146 performs a comparator function where it compares the voltage values received at the decoder 148 to a defined threshold value to provide the decoder 148 with an indication of the proximity of the voltage value to a decided binary value (as decided by the decoder 148). In other implementations, the threshold detector 146 performs more of a "threshold" function, where it receives the spatially resolved and equalized input signal and "thresholds" the received values to bit or byte values, which the decoder 148 can perform decoding iterations on.

Preferably, the decoder 148 and the threshold detector 146 will operate using a combination of real number values and byte and/or bit values during the various stages of decoding. For example, the real numbered voltage value or values that are received by the decoder 148 can be loaded into the threshold detector 146, which then returns bit values that include values that are "flagged" as unreliable by the decoder 148. The decoder 148 can run error correcting iterations on the bits to provide an update on the reliability of the bits, then use the threshold detector 146 (or another threshold detector) to return the values to updated real number values to pass on to a next decoding stage. Note that other components, although not shown, can also be included in the DCC system 145, including memory, demodulators, analog to digital converters, processors, among others as would be understood by one having ordinary skill in the art.

Figure 2:
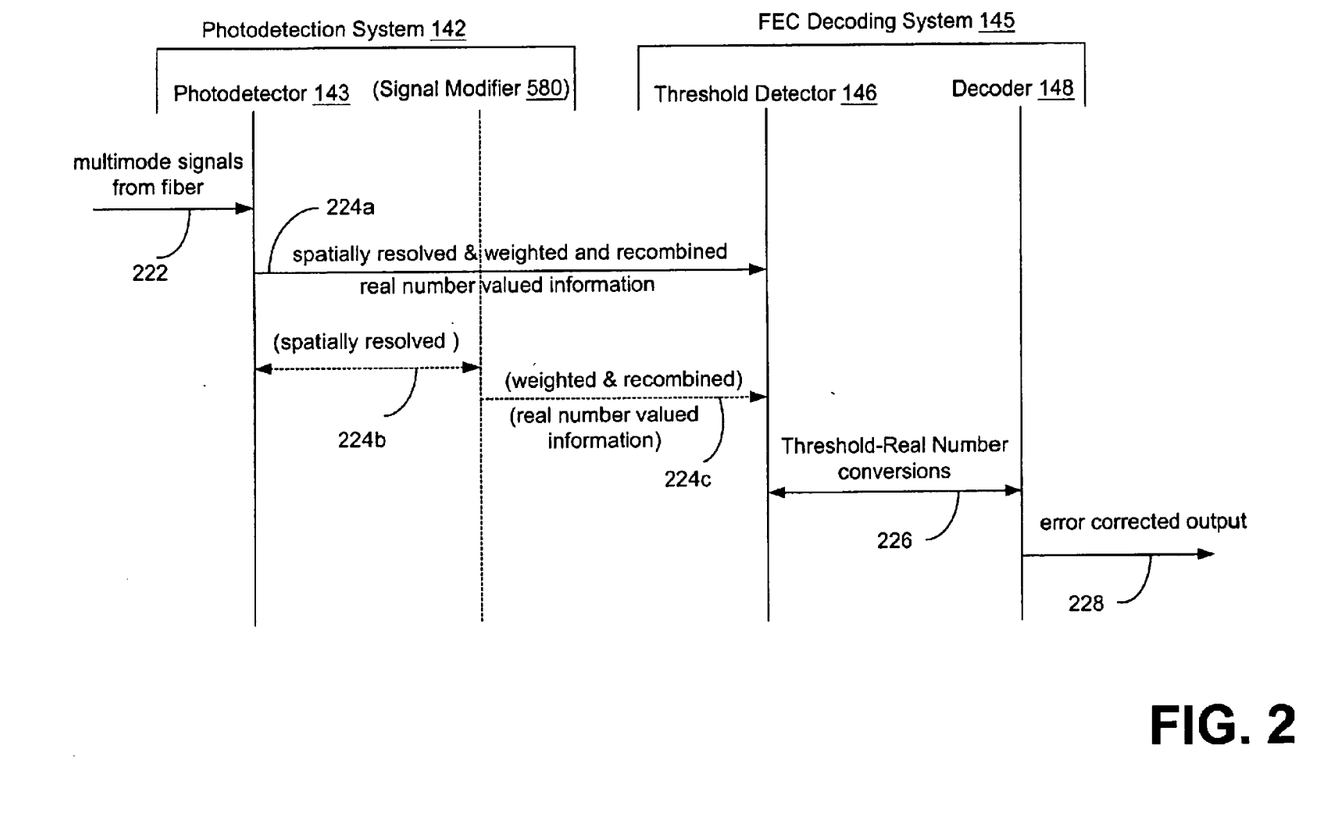
FIG. 2 is a timing diagram depicting functionality or operation of the example DCC system depicted in FIG. 1, in accordance with one embodiment of the invention.

FIG. 2 shows a timing diagram depicting components and component interactions encompassed by the DCC system 140 depicted in FIG. 1, in accordance with one embodiment of the invention. At step 222, the photodetector 143 of the photodetection system 142 receives the various propagating modes of an optical signal from the multimode fiber 130 (FIG. 1). In one implementation, the photodetector 143 performs spatial resolution, biases the signals to alter the magnitude and/or polarity of the received signals, and then recombines them to provide a single output voltage (step 224a). In another embodiment (denoted through steps 224b and 224c), the photodetector 143 provides spatial resolution and then passes the signals to the signal modifier 580 (step 224b). The signal modifier 580 performs a weighting and summation operation, and passes the signal to the threshold detector 146 (step 224c) of the FEC decoding system 145. The decoder 148 preferably determines the reliability of the received signal using the real number valued information it received from the photodetection system 142 and through cooperation with the threshold detector 146 (step 226).

For example, a received value can have a value of 0.1 V (assuming a system where a binary 1 value is 5.0V and a binary 0 value is 0.0V). Assume a threshold value configured at the threshold detector 146 of 2.5V. The decoder 148 recognizes that the 0.1V is very close to zero. Receiving input from the threshold detector 146 (or polling the threshold detector 146), the decoder 148 determines that the first voltage value is also much less than the threshold value. Voltage values with a high degree of reliability will preferably be updated to make the values more reliable and then they are passed to the column decoder (not shown) of the decoder 148 where further error correcting is employed, preferably independent of the row decoding. Voltage values with a low degree of reliability (e.g., near the threshold value) will also be updated, and that updated value will be used in column decoding.

Continuing the example, assume a next received voltage value of 2.4V is recognized by the decoder 148 as having a reliability issue, since 2.4V, although closer to 0.0V than 5.0 volts, is "near" the 2.5V voltage threshold of the threshold detector 146, and thus this voltage value is "flagged" as having suspect reliability. The decoder 148 can proceed to run an algorithm, for example a well-known Chase algorithm or a variant thereof, to evaluate many different permutations of values for this unreliable value (and others that follow) to determine an updated value that will be passed to the column decoder to improve (or reduce) the reliability of the voltage value for column decoding. Note that further information on some algorithms employed to update values can be found in the references entitled, "Near-optimum decoding of product codes: Block turbo codes," IEEE Trans. Commun., vol. 46, no. 8, pp. 1003–1010, August 1998, and D. Chase, "A class of algorithms for decoding block codes with channel measurement information," IEEE Trans. Inform. Theory, vol. IT-18, no. 1, pp. 170–182, January 1972, and the commonly assigned (assigned to Georgia Tech) patent application filed on the same date, and entitled, "Efficient Decoding of Product Codes", all three references which are herein incorporated by reference.

If the decoder 148, through running various permutations, determines a value that indicates the generated bit value should be zero and not one, then the row decoder of the decoder 148 preferably updates the value of 2.4V with a new value. The new value is preferably more indicative of a 0 bit value, say 2.0V for example, to provide a voltage value to the column decoder of the decoder 148 that is more reliable. Note that the column decoder may process this symbol position and determine that the value is more indicative of a binary "1", and thus a "reliability tug-of-war" between row and column decoding can occur through several iterations. Thus, even before the decoding process begins, the decoder 148 has information about which symbols are unreliable and which symbols are reliable, based on the voltage value received from the photodetection system 142 and its proximity in value to the defined threshold value configured at the threshold detector 146, or elsewhere.

Finally, the error corrected, decoded signal is preferably output by the decoder 148 to a device, such as a computer or other device, or in other embodiments, the decoder 148 is internal to a device that provides further processing of the decoded signal (step 228).

Figure 3:
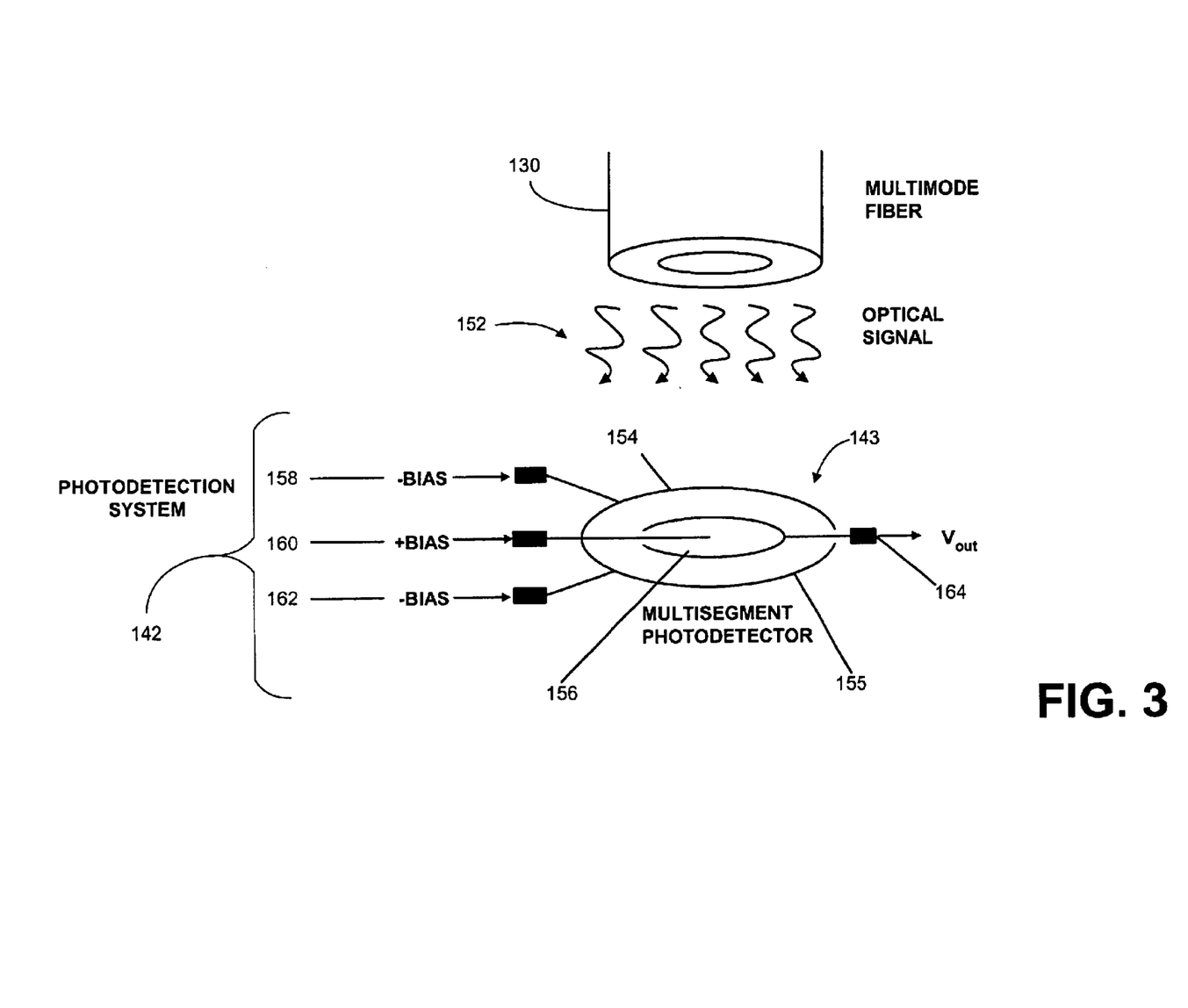
FIG. 3 is a schematic diagram of one embodiment of an example photodetection system for use with the example optical fiber communication system of FIG. 1.

FIG. 3 is a schematic diagram of one embodiment of the example photodetection system 142 that could be used with the optical fiber communication system 100 of FIG. 1. The example photodetection system 142 includes the example photodetector 143. The example photodetector 143 is preferably multi-segmented, and includes associated biasing circuitry. The photodetector 143 receives a plurality of optical signals 152 exiting the multi-mode fiber 130. The photodetector 143 may be shaped and arranged in a number of arbitrary manners. The example photodetector 143 includes coplanar, annular detector segments 154, 155, and 156. The photodetector 143 is not limited to having coplanar, annular photodetection segments, and other embodiments of the photodetector 143 may include nonplanar, non-annular and/or non-concentric photodetector segments.

The photodetector 143 is not limited to the number of detector segments shown in the configuration of FIG. 3. Each individual detector of the photodetector 143 detects the plurality of optical signals 152 (also referred to as modes) differently according to each detector's position relative to the multi-mode fiber 130.

Also shown in FIG. 3 is one example mechanism for adjusting the signals 152. The optical signals 152 carry a portion of the original optical signal launched in the fiber 130 by the laser 124 (FIG. 1) and a portion of interference optical modes caused by modal dispersion. Generally, the geometric configuration of the detector segments 154, 155, and 156 provides for isolating an optical signal 152, wherein the isolated signal is a combination of the original optical signal and interference signals generated from the multiple modes. The three segments receive bias 158, 160, and 162.

In one implementation, segment 156 detects a combination of modes having a weak portion of the original optical signal and a portion of the interference signal. This segment 156 is positively biased by 160, producing no change in the polarity of the mode. Segments 154 and 155 detect a combination of modes having a strong portion of the original optical signal and a portion of the interference signal. These segments are negative biased by 158 and 162 causing the respective interfering signal to have a negative polarity. Combining all these segment signals causes a cancellation of the interference signals and produces an output signal that closely approximates the optical signal originally launched into the fiber 130.

Bias 158, 160, and 162, such as a voltage bias, applied across the coplanar, annular segments 154, 155, and 156 of the photodetector 143 modifies the signals produced from the photodetector 143 and assists in the direction and flow of electrons producing an output, such as voltage $V_{out}$ at contact 164. The biases 158, 160, and 162 shown in FIG. 3 are specific examples of weighting factors. The signals are weighted based on a different bias magnitude applied to the photodetector 143 and one or more of their polarity is changed. When summed, the detected signals result in an output that can closely approximate the original optical signal coupled into the fiber 130.

In one embodiment, as described above, the modification made to the individually detected signals is by applying a bias of different magnitude and/or polarity to each segment. In an alternative embodiment, the modification is achieved by any combination of electrical and/or mechanical instruments used to impart changes in amplitude and/or phase to the electrical signal. Additionally, a number of diffractive or reflective optical elements may be positioned between the multi-mode fiber 130 and the photodetector 143.

Figure 4:
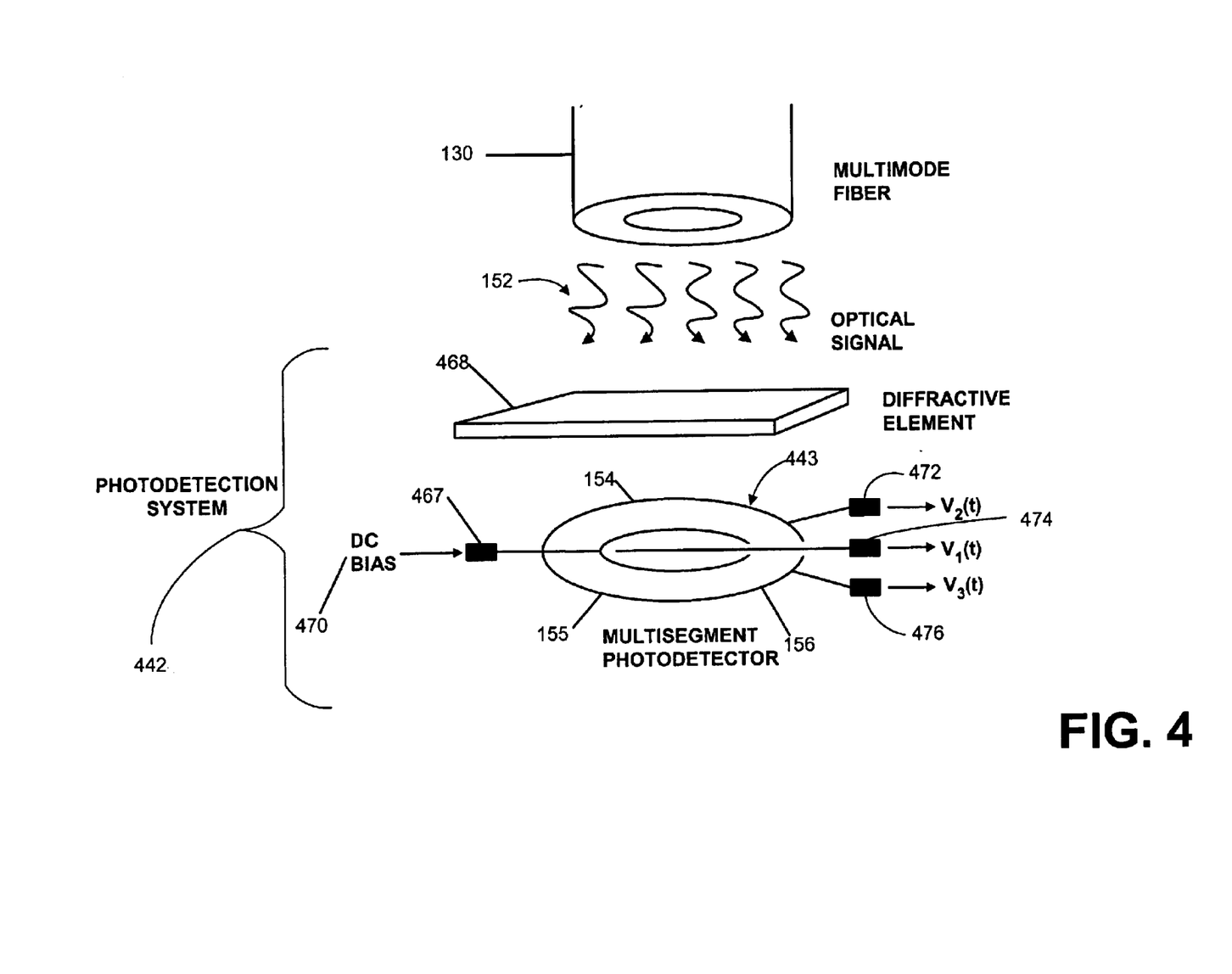
FIG. 4 is a schematic diagram of an alternative embodiment of an example photodetection system for use with the example optical fiber communication system of FIG. 1.

FIG. 4 shows a schematic diagram of an alternative embodiment of the photodetection system 142 shown in FIG. 3, the alternative embodiment referred to as photodetection system 442. The photodetection system 442 includes a photodetector 443 that is preferably multi-segmented. The photodetector 443 receives a plurality of optical signals 152 from a multimode fiber 130. A number of diffractive or reflective optical elements may be positioned between the multimode fiber 130 and the photodetector 443. For instance, a diffractive element 468 between the photodetector 443 and the multimode fiber 130 refocuses the optical signals 152 in a specific manner (e.g., the diffractive element 468 can redirect the mode to a specific segment) before the optical signals 152 enter the photodetector 443. The intervening optical elements can include, but are not limited to, lenses, mirrors and/or holographic elements. The detector segments of the photodetector 443 receive identical biases, and thus an additional, external means of applying the desired weighting factors is used for compensation for modal dispersion.

A direct current (DC) bias 470 across the external input contact 467 of the photodetector 443 provides an electrical force to cause the generated electrons to exit the segments through the appropriate contact (472, 474, or 476) defining the segment (e.g., through contact 472 if the electrons are generated between contacts 467 and 472, through contact 474 if generated between contacts 467 and 474, etc.). As shown in FIG. 4, the diffractive element 468 affects a change in direction of the output signals at contacts 472, 474, and 476. For illustrative purposes only, three outputs at contacts 472, 474, and 476 exit the photodetector 443. The photodetector 443 is not limited to producing only three output signals.

Figure 5:
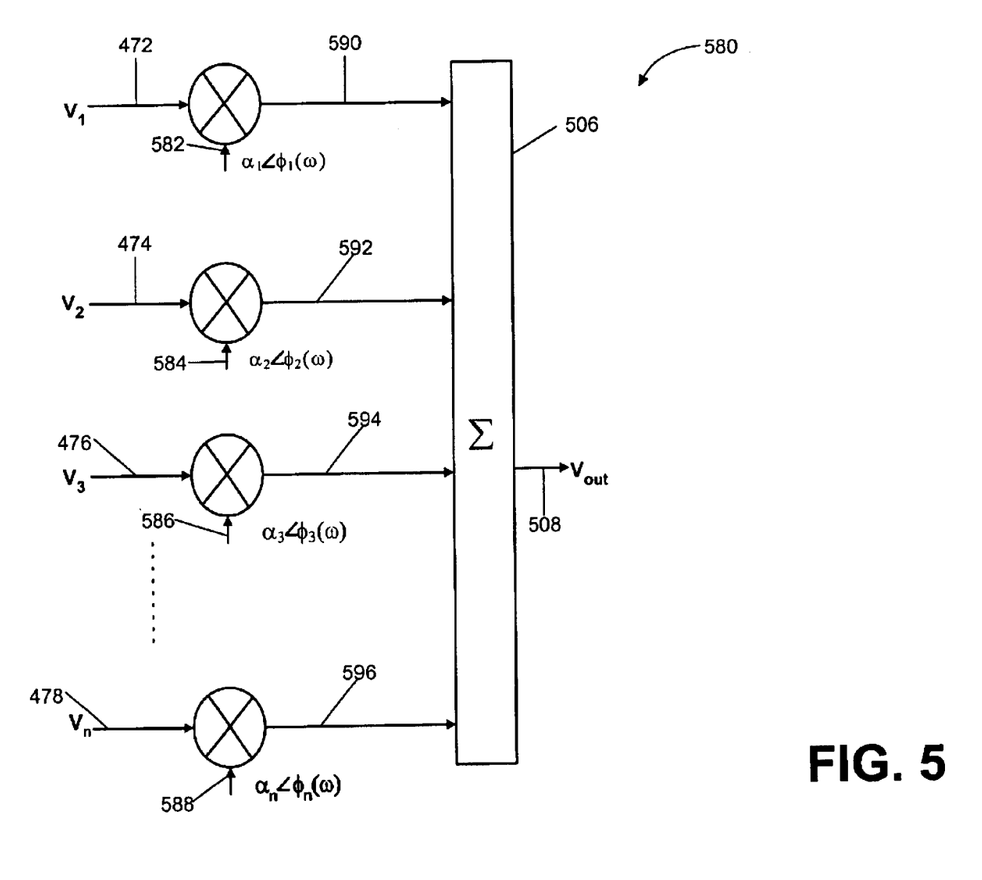
FIG. 5 is a schematic diagram of one embodiment of an example signal modifier used to modify the signals from the example photodetector of the example photodetection systems shown in FIG. 3 and/or FIG. 4.

FIG. 5 is a schematic diagram of an embodiment of a signal modifier 580 used to modify the signals from the photodetectors 143, 443 of FIG. 3 and/or FIG. 4. Specifically, this signal modifier 580 is a system representation of what is occurring to the signal from each segment. For FIG. 3, the functionality of the signal modifier 580 occurs internally (i.e., via the bias circuit and multi-segment photodetector 143) through proper selection of the bias. Signals $V_1$, $V_2$, $V_3$ to $V_n$ (at contacts 472, 474, 476, and 478, respectively) can be modified by weighting factors as discussed above including incorporating bias, attenuation, amplification and/or delay. For illustrative purposes, signals at 472, 474, 476, and 478 experience an arbitrary vector scaling factor 582, 584, 586, and 588. This scaling factor can be provided by the bias selection (for the embodiment illustrated in FIG. 3) or via a discrete component not shown (in the embodiment illustrated in FIG. 4), as one example. The signals at 472, 474, 476, and 478 may be subjected to another weighting factor or a combination of weighting factors. The determination of the specific modification to be applied to each detected signal may be done in several ways including, but not limited to, the use of fixed, arbitrary settings; the use of techniques during which a known signal is transmitted and the modification is set systematically and/or randomly until the detected output replicates the known signal; or by the use of computing (analog and/or digital) software and/or hardware to apply adjustments to the detected signals to satisfy any other criteria set by the user or designer of the system.

Interim outputs 590, 592, 594, and 596 are summed by summer 506 to produce an output signal 508 that, if an equivalent optical signal, closely approximates the optical signal originally coupled into the fiber 130 (FIG. 1). The output signal 508 can be used in a variety of manners including converting the signal to digital using an analog-to-digital converter (not shown) and then providing the signal to a device such as a computer for use in a user's application. Further information on the spatial resolution and equalization of a received optical signal can be found in the commonly assigned (assigned to Georgia Tech) patent applications entitled, "Compensation of Modal Dispersion in Optical Waveguides", filed Feb. 1, 2002, and "Segmented Photodetectors for Detection and Compensation of Modal Dispersion in Optical Waveguides", filed Feb. 1, 2002, both incorporated herein by reference. Preferably, the output signal 508 is transferred to the FEC decoding system 145 (FIG. 1), as described below.

One goal of the FEC decoding system 145 (FIG. 1) is to provide coding gain to "recover" from the power loss that can arise from the spatial resolution and equalization process of the photodetection system 142 (FIG. 1). As described above, the FEC decoding system 145 can implement error correction on block codes formatted in one dimension or two dimensions. An example implementation will now be described for two dimensional product codes wherein iterative soft decision processing is implemented, and wherein the voltage values (or current values) received (e.g., output signal 164 (FIG. 3) or output signal 508 (FIG. 5)) are real number valued and thus used by the FEC decoding system 145 to determine the reliability of the received values. It is noted, as indicated above, that the following implementation includes one example FEC mechanism, and that substantially all types of FEC codes (e.g., turbo product codes, product/array codes, turbo codes, block codes, convolutional codes, LDPC codes, etc.) are included within the scope of the invention. The process of iterative soft decision decoding of product codes can generally be described mathematically. The decoder 148 (FIG. 1A) preferably applies a Chase algorithm, or variants thereof, or other decoding algorithms, iteratively on voltage values formatted in rows and columns. The Chase algorithm is a sub-optimum decoding method based on forming test patterns preferably using real number value information from the photodetection system 142 (FIG. 1) and passing these test patterns through an algebraic decoder for the employed block code. These test patterns are formed by perturbing the p least reliable symbol positions (p being a fixed or variable design parameter that is preferably experimentally determined) in the received noisy sequence (p is selected as p<<k). The number of test patterns is equal to $2^p$. After decoding of the test patterns, the most likely among the generated candidate codewords is assigned as the decided codeword.

The reliability information for symbol position j is expressed in terms of a log-likelihood ratio (LLR) given by:

$$A(d_j) = \log\left[(Pr(c_j=+1|R))/(Pr(c_j=-1|R))\right], \qquad \text{(Eq. 1)}$$

where $D = d_0 \ldots d_{n-1} (d_j \in \{-1, +1\})$ is the decided codeword after Chase decoding, $R = r_0, \ldots r_{n-1}$ denotes the received noisy sequence, and $C = c_0 \ldots c_{n-1}$ is the transmitted codeword. If $\hat{D} = \hat{d} \ldots \hat{d}_{n-1}$ (if it exists) is the most likely competing codeword among the candidate codewords with $\hat{d}_j \neq d_j$, then for a stationary additive white Gaussian noise (AWGN) communication medium and a communication system using binary phase shift keying (BPSK), for example, the LLR of symbol position can be approximated by:

$$A(d_j) \approx [(|R-\hat{D}|^2 - |R-D|^2)/4] d_j, \qquad \text{(Eq. 2)}$$

where $|A-B|^2$ denotes the squared Euclidean distance between vectors A and B. Equation 2 is essentially describing how the new information (e.g., the updated voltage value) is computed. Note that other mechanisms for determining LLR can be employed, such as those using inner product terms as described in the commonly assigned patent application entitled, "Efficient Decoding of Product Codes" as referenced herein. The extrinsic information $w_j$ for the jth position (e.g., the updated voltage values (symbol entries in the product code arrays) that are passed to the column decoder, and vice versa) is found by:

$w_j = \{A (d_j) - r_j,$ if a competing $\hat{D}$ exists, or $\beta d_j,$ if no competing $\hat{D}\}$, (Eq. 3) where $\beta$ is a reliability factor.

Once the extrinsic information has been determined, the input to the next decoding stage is updated as $$r_j' = r_j + \gamma w_j,  \quad \text{(Eq. 4)}$$

where $\gamma$ is a weight factor introduced to combat high bit error rate (BER) and high standard deviation in $w_j$ during the first iterations. In other words, for the example implementation described above, the new $r_j$ in a next stage decoding is the old $r_j$ (i.e., the initial voltage value received from the photodetection system 142 (FIG. 1) (or various embodiments herein) and entered at a position in the product code array) plus a weighted updated voltage value. Preferably, $\gamma$ is an experimentally determined value. The operations above can be performed on all symbols of a product codeword, hence equation 4 can be expressed as $$[R'] = [R] + \gamma[W]. \quad \text{(Eq. 5)}$$

Figure 6:
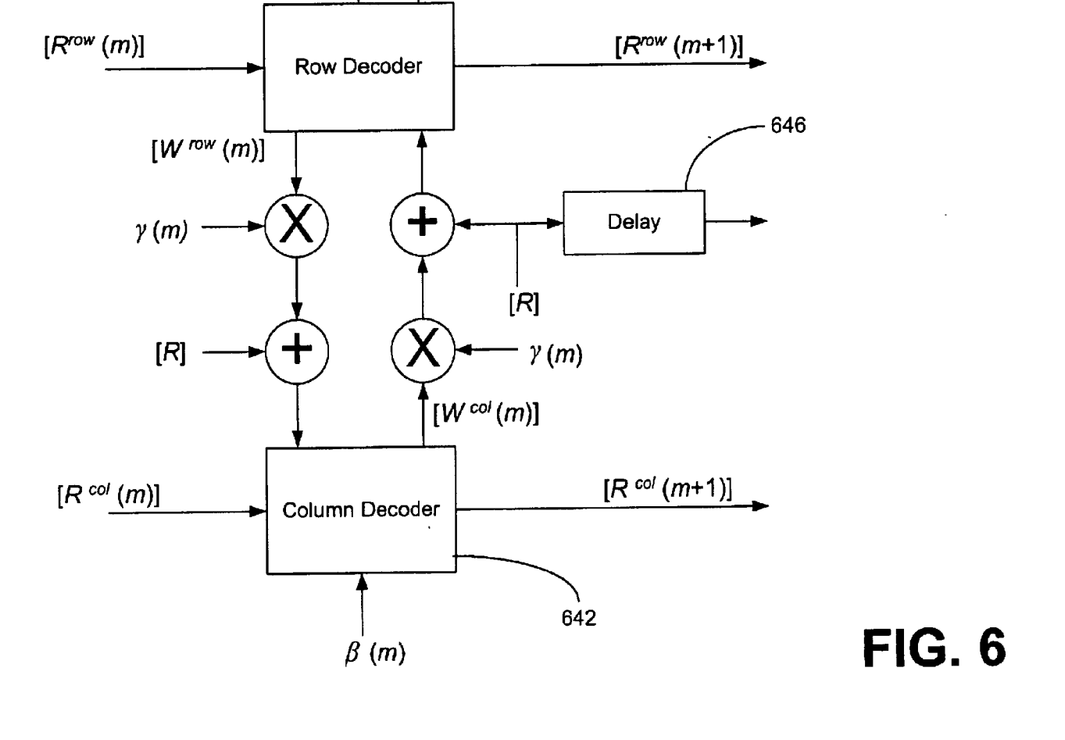
FIG. 6 is a functional block diagram that illustrates one example decoder embodiment of the example FEC decoding system depicted in FIG. 1 for decoding product codes, in accordance with one embodiment of the invention.

A functional block diagram that illustrates the functionality of the example decoder 148 (FIG. 1) at one stage is shown in FIG. 6 for a parallel decoding scheme, in accordance with one embodiment of the invention. In other embodiments, a serial or sequential mechanism can be employed for this information sharing, and other FEC decoding schemes can be employed by the decoder 148 as described above. As shown, the prior equations are somewhat reflected in the schematic. The example decoder 148 implemented for iterative soft decision decoding preferably includes at least one row decoder 640 and at least one column decoder 642. The row and column decoders 640 and 642 operate here in parallel and update each other immediately after a row or column has been decoded. Furthermore, a delay element 646 is utilized. Relating the above math formulations to the example decoder of FIG. 6, the integer "m" denotes the number of the current full iteration. The [R] represents that the extrinsic information (e.g., real number valued voltage) is used for each decoding and for each iteration. $[R^{row}]$ and $[R^{col}]$ in the first iteration are equal to [R], but once updated, the $[R^{row}]$ includes the updated extrinsic information received from the column decoder ($\gamma \times [W^{col}]$) and the $[R^{col}]$ includes the updated extrinsic information received from the row ($\gamma \times [W^{row}]$) to be passed to the next iteration, along with the [R] channel information. The matrices $[W^{row}]$ and $[W^{col}]$ are the row and column extrinsic information matrices, respectively, and are transferred on a row—row or column—column basis.

The $m^{th}$ iteration of the row decoding process generates extrinsic information (e.g., updated voltage values) represented by $[W^{row}]$. Substantially simultaneously, the column decoder 642 generates, on the $m^{th}$ iteration, extrinsic information $[W^{col}]$. These matrices are preferably scaled by $\gamma$, which is preferably a function of the iteration, producing a scaling effect that increases, as the iterations continue, to one. Following the scaling, ($\gamma \times W$), the scaled value is added to the original received values R (e.g., the values received from the photodetection system 142 (FIG. 1)) which gets fed to the respective column 642 or row decoder 640. Once this occurs for an entire product code array, the new R (and old R) is passed on to the block again for the $m^{th}+1$ iteration (i.e., the next iteration).

In one implementation, the $m^{th}+1$ iteration is fed back to the row and column decoder 640 and 642. In other implementations, the block diagram of FIG. 6 is just replicated for the $m^{th}+1$ iteration. Because the first iteration for decoding the rows and columns takes a finite amount of time, there is a delay between iterations, as depicted by the delay element 646. This is in contrast to the delays experienced in sequential decoding, which typically include a first delay until the first iteration of the row decoding has occurred, and then a second delay until the first iteration of the column decoding has occurred. Note that $\beta$ is a reliability factor, as explained above, which is essentially a scaling factor that handles circumstances where the row and/or column decoder cannot implement decoding.

Figure 7A:
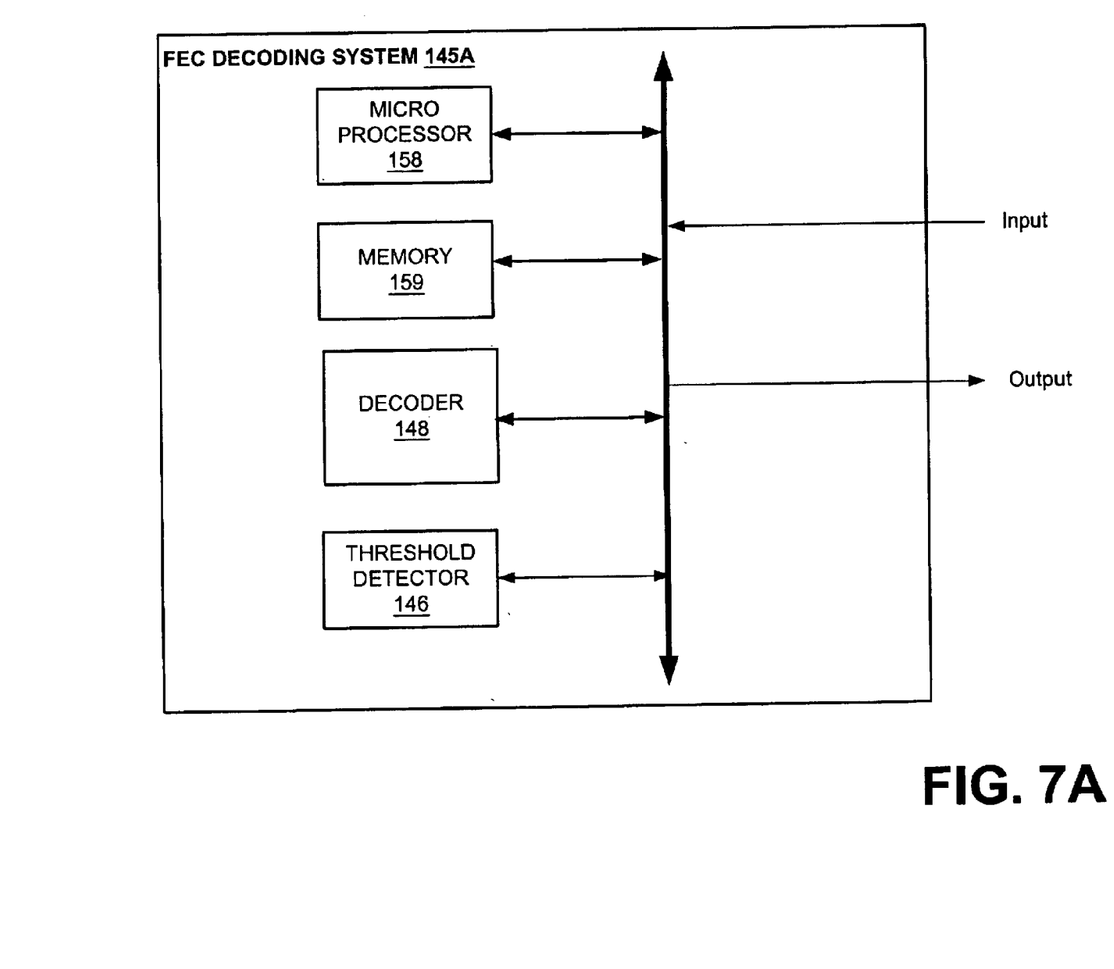
FIG. 7A is a schematic diagram of select internal circuitry of the example FEC decoding system depicted in FIG. 1, in accordance with one embodiment of the invention.
Figure 7B:
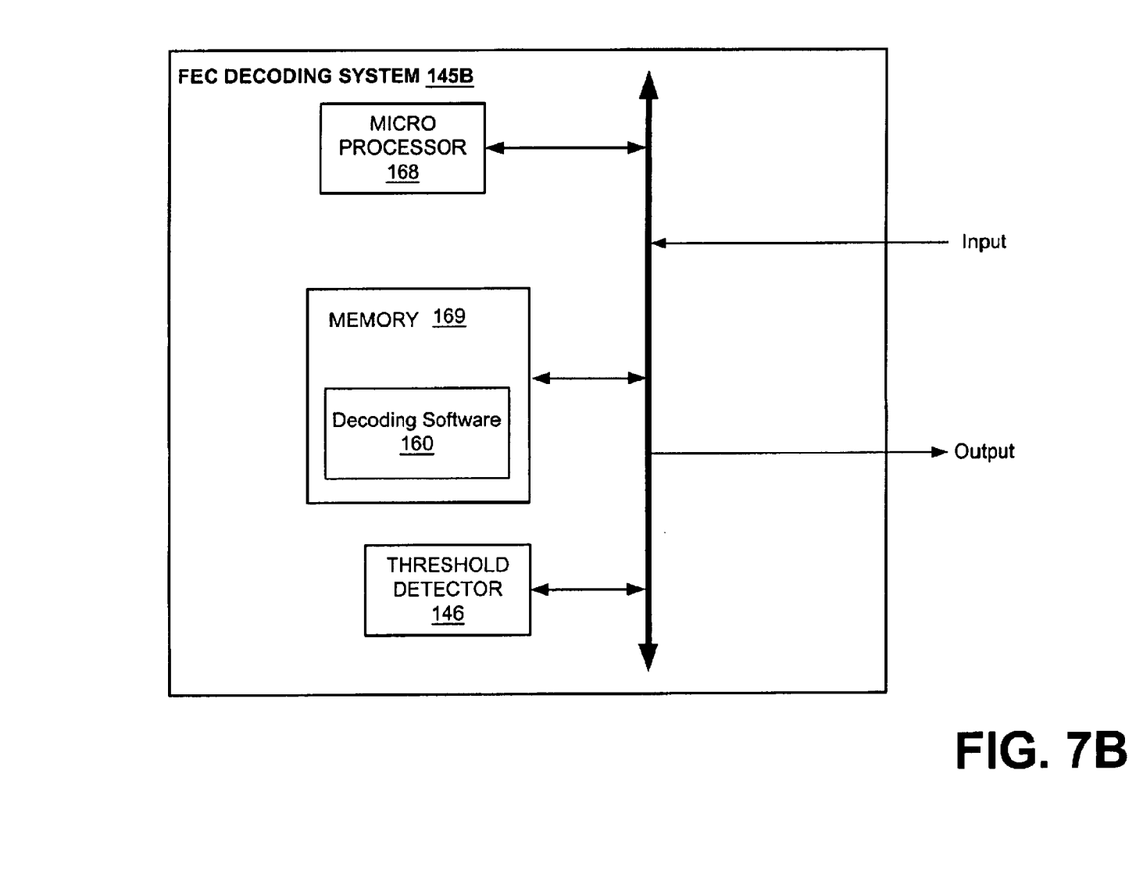
FIG. 7B is a schematic diagram of select internal circuitry of the example FEC decoding system depicted in FIG. 1, in accordance with one embodiment of the invention.

FIGS. 7A–7B are block diagram illustrations of select components of the FEC decoding system 145 of FIG. 1 in accordance with two embodiments of the invention. FIG. 7A illustrates the FEC decoding system 145A in which the decoder 148 is implemented as hardware, in accordance with one embodiment. The decoder 148 can be custom made or a commercially available application specific integrated circuit (ASIC), for example, running embedded decoding software alone or in combination with the microprocessor 158. That is, the decoding functionality can be included in an ASIC that comprises, for example, a processing component such as an arithmetic logic unit for handling computations during the decoding of rows and columns. Data transfers to and from memory 159 and/or to and from the threshold detector 146 for the various matrices (as explained below) during decoding can occur through direct memory access or via cooperation with the microprocessor 158, among other mechanisms. The microprocessor 158 is a hardware device for executing software, particularly that stored in memory 159. The microprocessor 158 can be any custom made or commercially available processor, a central processing unit (CPU), an auxiliary processor among several processors associated with the decoder 148, a semiconductor based microprocessor (in the form of a microchip or chip set), a microprocessor, or generally any device for executing software instructions. The threshold detector 146 can be software and/or hardware that is a separate component in the FEC decoding system 145A, or in other embodiments, integrated with the decoder 148, or still in other embodiments, omitted from the FEC decoding system 145 and implemented as an entity separate from the FEC decoding system 145 yet in communication with the FEC decoding system 145. The -FEC decoding system 145 can include more components or can omit some of the elements shown, in some embodiments.

In one preferred embodiment, where the decoder 148 is implemented in hardware, the decoder 148 can be implemented with any or a combination of the following technologies, which are each well known in the art: a discrete logic circuit(s) having logic gates for implementing logic functions upon data signals, an ASIC having appropriate combinational logic gates, a programmable gate array (s) (PGA), a field programmable gate array (FPGA), etc.

FIG. 7B describes another embodiment, wherein decoding software 160 is embodied as a programming structure in memory 169, as will be described below. The memory 169 can include any one or combination of volatile memory elements (e.g., random access memory (RAM, such as DRAM, SRAM, SDRAM, etc.)) and nonvolatile memory elements (e.g., ROM, bard drive, tape, CDROM, etc.). Moreover, the memory 169 may incorporate electronic, magnetic, optical, and/or other types of storage media. Note that the memory 169 can have a distributed architecture, where various components are situated remote from one another, but can be accessed by the microprocessor 168.

In one implementation, the software in memory 169 can include decoding software 160, which provides executable instructions for implementing the FEC decoding operations. The software in memory 169 may also include one or more separate programs, each of which comprises an ordered listing of executable instructions for implementing logical functions and operating system functions such as controlling the execution of other computer programs, providing scheduling, input-output control, file and data management, memory management, and communication control and related services.

When the FEC decoding system 145 (145A or 145B) is in operation, the microprocessor 158 (or 168) is configured to execute software stored within the memory 159 (or 169) to communicate data to and from the memory 159 (or 169), and to generally control operations of the FEC decoding system 145A, 145B pursuant to the software.

When the decoding functionality is implemented in software, it should be noted that the decoding software 160 can be stored on any computer-readable medium for use by or in connection with any computer related system or method. In the context of this document, a computer readable medium is an electronic, magnetic, optical, or other physical device or means that can contain or store a computer program for use by or in connection with a computer related system or method.

The decoding software 160 and/or the decoder 148 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware and/or software configured mediums.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for correcting modal dispersion and errors in an optical fiber system, comprising:
    a plurality of detection zones for detecting a plurality of modes of light incident on the plurality of detection zones, the plurality of detection zones positioned on a substrate and arranged in a coplanar, annular configuration;
    a plurality of segments located within the detection zones, each of the segments being adapted to detect the plurality of modes; and
    logic configured to receive a resultant signal output from the detection zones and provide forward error correction decoding of the resultant signal.

2. The system of claim 1, wherein the plurality of segments further comprises interdigitating, planar metal-semiconductor-metal (MSM).

3. The system of claim 1, wherein the plurality of detection zones are concentric, annular detection zones.

4. The system of claim 1, wherein the plurality of detection zones are coplanar detection zones.

5. The system of claim 1, wherein one detection zone detects a combination of modes that is substantially distinct from a mode of light detected by other detection zones.

6. The system of claim 1, further comprising an optical element placed between the photodetector and a fiber for enhancing the separation of a plurality of modes by the plurality of detection zones.

7. The system of claim 6, wherein the optical element comprises a diffractive element.

8. The system of claim 6, wherein the optical element comprises a binary diffractive element.

9. The system of claim 6, wherein the optical element comprises a holographic element.

10. The system of claim 1, wherein the logic is further configured to provide forward error correction for coding formats that include at least one of block codes, Reed-Solomon codes, product codes, turbo product codes, turbo codes, low density parity-check codes, and convolutional codes.

11. The system of claim 1, wherein the logic is further configured to determine the reliability of row symbols and column symbols for a decoded row and a decoded column based in part on real number valued information received from the resultant output signal, wherein the logic is further configured to pass the reliability determinations of the row symbols to decode a next column of symbols and pass the reliability determinations of the column symbols to decode a next row of symbols.

12. The system of claim 1, wherein the logic is included in at least one of a discrete logic circuit having logic gates for implementing logic functions upon data signals, an application specific integrated circuit having combinational logic gates, a programmable gate array, and a field programmable gate array.

13. The system of claim 1, wherein the logic is included in a computer-readable medium.

14. The system of claim 1, further including at least one of a processor, memory, and a threshold device that communicates with the logic in providing decoding functionality.

15. The system of claim 14, wherein the processor and the logic are located in separate devices.

16. The system of claim 14, wherein the processor and the logic are located in the same device.

17. A system for correcting modal dispersion and errors in an optical fiber system, comprising:
   a multisegment photodetector coupled to an end of an optical fiber for detecting optical signals exiting the optical fiber and for converting the optical signals to an electrical output, the multisegment photodetector including a plurality of photodetector regions configured such that one of the plurality of photodetectors regions intercepts a mode in a manner distinct from another of the plurality of photodetectors; and
   logic configured to receive a resultant signal output from the photodetector regions and provide forward error correction decoding of the resultant signal.

18. The system of claim 17, wherein the plurality of photodetector regions comprise an array of coplanar, annular regions.

19. The system of claim 17, wherein the plurality of photodetector regions further comprises coplanar, circular sections having a plurality of interdigitated, planar MSM segments.

20. The system of claim 17, wherein the plurality of photodetector regions further comprises a plurality of interdigitated segments representing a conductive portion of the plurality of photodetector regions.

21. The system of claim 17, wherein the plurality of photodetector regions further comprises a plurality of doped semiconductor materials creating a PIN structure.

22. The system of claim 17, further comprising a diffractive element coupled between the multisegment photodetector and the end of the optical fiber for directing the optical signals into the multisegment photodetector.

23. The system of claim 17, further comprising an output circuit coupled to the plurality of photodetector regions for modifying signals from the plurality of photodetector regions and producing a signal substantially similar to an optical signal coupled into the optical fiber.

24. The system of claim 17, further comprising an optical signal launched into the optical fiber.

25. The system of claim 17, further comprising a network including at least one of attenuators, amplifier, phase shifters and transmission lines that modify a plurality of detected signals, individually, and subsequently-combine the modified detected signals to reproduce, as closely as possible, the originally transmitted signal.

26. The system of claim 17, further comprising a network for performing digital signal processing on a plurality of detected signals, individually, and subsequently combining the modified detected signals to reproduce, as closely as possible, the originally transmitted signal.

27. The system of claim 17, wherein the logic is further configured to provide forward error correction for coding formats that include at least one of block codes, Reed-Solomon codes, product codes, turbo product codes, turbo codes, low density parity-check codes, and convolutional codes.

28. The system of claim 17, wherein the logic is further configured to determine the reliability of row symbols and column symbols for a decoded row and a decoded column based in part on real number valued information received from the resultant output signal, wherein the logic is further configured to pass the reliability determinations of the row symbols to decode a next column of symbols and pass the reliability determinations of the column symbols to decode a next row of symbols.

29. The system of claim 17, wherein the logic is included in at least one of a discrete logic circuit having logic gates for implementing logic functions upon data signals, an application specific integrated circuit having combinational logic gates, a programmable gate array, and a field programmable gate array.

30. The system of claim 17, wherein the logic is included in a computer-readable medium.

31. The system of claim 17, further including at least one of a processor, memory, and a threshold device that communicates with the logic in providing decoding functionality.

32. The system of claim 31, wherein the processor and the logic are located in separate devices.

33. The system of claim 31, wherein the processor and the logic are located in the same device.

34. A system for correcting modal dispersion and errors in an optical fiber system, comprising:
   means for individually detecting a plurality of modes exiting an optical fiber;
   means for correcting for timing differences in the plurality of modes;
   means for converting optical signals from the plurality of modes into an electrical output;
   means for modifying the electrical output to minimize effects of modal dispersion; and
   means for implementing forward error correcting on the modified electrical output.

35. A system for decoding information transferred over a multimode fiber link, said system comprising:
   logic configured to determine the reliability of symbols received in a signal output from a photodetection system, wherein the reliability of the symbols is based in part on real number valued information received from the symbols, wherein the logic is further configured to decode the symbols using the reliability determinations.

36. A method for detecting and correcting for modal dispersion and decoding in a multi-mode fiber optic system having an optical signal coupled into a multi-mode fiber, comprising the steps of:
   detecting a plurality of optical signals radiating from an end of the multi-mode fiber by a multisegment photodetector having different detector regions that detect different portions of the plurality of optical signals;
   modifying detected signals by the multisegment photodetector to reduce effects of modal dispersion among the plurality of optical signals; and
   forward error correcting the modified detected signals.

37. The method of claim 36, wherein the step of modifying detected signals by the multisegment photodetector includes using weighting factors that adjust the detected signals.

38. The method of claim 36, further comprising the steps of converting the plurality of optical signals into at least two electrical signals and modifying at least one signal by weighting factors to produce a signal that approximates a value of the optical signal originally coupled into the multi-mode fiber.

39. The method of claim 38, further comprising the step of combining at least two signals modified together to produce the modified detected signals.

40. The method of claim 36, wherein the step of modifying detected signals by the multisegment photodetector includes altering bias among the multiple detection regions as the weighting factor.

41. The method of claim 36, wherein the step of modifying detected signals by the multisegment photodetector includes using attenuation as the weighting factor.

42. The method of claim 36, wherein the step of modifying detected signals by the multisegment photodetector includes using amplification as the weighting factor.

43. The method of claim 36, wherein the step of modifying detected signals by the multisegment photodetector includes using phase shifting as the weighting factor.

44. The method of claim 36, wherein the step of modifying detected signals by the multisegment photodetector includes using delay as the weighting factor.

45. The method of claim 36, wherein the step of modifying detected signals by the multisegment photodetector includes arbitrarily selecting the weighting factors.

46. The method of claim 36, wherein the step of modifying detected signals by the multisegment photodetector further comprises examining an output of the multi-segment photodetector and adjusting a weighting factor until the output approximates a value of the optical signal.

47. The method of claim 36, wherein the step of detecting a plurality of optical signals radiating from an end of the multi-mode fiber by a multi-segment photodetector includes using the multisegment photodetector having at least two concentric, coplanar, and annular photodetectors.

48. The method of claim 36, wherein the step of detecting a plurality of optical signals radiating from an end of the multi-mode fiber further comprises inserting a diffractive optical element between the fiber and the multisegment photodetector for modifying the distribution of optical signals among the plurality of detection regions.

49. The method of claim 36, wherein the step of detecting a plurality of optical signals radiating from an end of the multi-mode fiber further comprises inserting a reflective optical elements between the fiber and the multisegment photodetector to modify the distribution of optical signals among the plurality of detection regions.

50. The method of claim 36, wherein the step of forward error correcting includes forward error correcting symbols formatted in at least one of block codes, Reed-Solomon codes, product codes, turbo product codes, turbo codes, low density parity-check codes, and convolutional codes.

51. The method of claim 36, wherein the step of forward error correcting includes the steps of determining the reliability of row symbols and column symbols for a decoded row and a decoded column based in part on real number valued information received from the resultant output signal and passing the reliability determinations of the row symbols to decode a next column of symbols and passing the reliability determinations of the column symbols to decode a next row of symbols.

52. A method for detection and compensation of multimodes produced from a multimode optical fiber system and decoding, comprising the steps of:

converting an input electrical signal to an optical signal;

launching an optical signal into a multimode fiber;

positioning a photodetection system at an end of the multimode fiber to receive a plurality of optical signals exiting the multimode fiber;

detecting the multiple optical signals by multiple detectors of the photodetection system producing detected electrical signals;

modifying the detected electrical signals;

adding together the detected electrical signals to generate an output electrical signal corresponding to the input electrical signal; and forward error correcting the output electrical signal.

53. The method of claim 52, further comprising the step of inserting an intervening optical element between the fiber and photodetection system to alter the distribution optical light to the plurality of detection zones.

54. The method of claim 52, wherein the step of modifying the detected optical signals further comprises the step of introducing a delay to any of the detected optical signals.

55. The method of claim 52, wherein the step of modifying the detected optical signals further comprises the step of attenuating any of the detected optical signals.

56. The method of claim 52, wherein the step of modifying the detected optical signals further comprises the step of biasing any of the detected optical signals.

57. The method of claim 52, wherein the step of modifying the detected optical signals further comprises the step of amplifying any of the detected optical signals.

58. The method of claim 52, wherein the step of modifying the detected optical signals further comprises the step of phase shifting any of the detected optical signals.

59. The method of claim 52, wherein the step of modifying the detected optical signals includes using instruments including at least one of electronic, semiconductor and mechanically based instruments.

60. The method of claim 52, wherein the step of forward error correcting includes forward error correcting symbols formatted in at least one of block codes, Reed-Solomon codes, product codes, turbo product codes, turbo codes, low density parity-check codes, and convolutional codes.

61. The method of claim 52, wherein the step of forward error correcting includes the steps of determining the reliability of row symbols and column symbols for a decoded row and a decoded column based in part on real number valued information received from the resultant output signal and passing the reliability determinations of the row symbols to decode a next column of symbols and passing the reliability determinations of the column symbols to decode a next row of symbols.

62. A method for decoding information transferred over a multimode fiber link, said method comprising the steps of:

determining the reliability of symbols received in a signal output from a photodetection system, wherein the reliability of the symbols is based in part on real number valued information received from the symbols; and decoding the symbols using the reliability determinations.

63. The method of claim 62, wherein the steps of determining and decoding includes the steps of determining the reliability of row symbols and column symbols for a decoded row and a decoded column based in part on real number valued information received from the resultant output signal and passing the reliability determinations of the row symbols to decode a next column of symbols and passing the reliability determinations of the column symbols to decode a next row of symbols.

* * * * *